(12) United States Patent
Lee

(10) Patent No.: US 10,027,800 B2
(45) Date of Patent: Jul. 17, 2018

(54) METHOD AND APPARATUS FOR ANALYZING SITUATION OF CALLED TERMINAL, AND PROGRAM FOR IMPLEMENTING THE SAME

(71) Applicant: NEXWILL CO., LTD, Gunpo-si (KR)

(72) Inventor: Jae Sung Lee, Gunpo-si (KR)

(73) Assignee: NEXWILL CO., LTD, Gunpo-si (KR)

( * ) Notice: Subject to any disclaimer, the term of this patent is extended or adjusted under 35 U.S.C. 154(b) by 0 days.

(21) Appl. No.: 15/531,484

(22) PCT Filed: Oct. 26, 2015

(86) PCT No.: PCT/KR2015/011325
§ 371 (c)(1),
(2) Date: May 30, 2017

(87) PCT Pub. No.: WO2016/089011
PCT Pub. Date: Jun. 9, 2016

(65) Prior Publication Data
US 2017/0272572 A1      Sep. 21, 2017

(30) Foreign Application Priority Data

Dec. 5, 2014 (KR) ........................ 10-2014-0174433

(51) Int. Cl.
*H04M 1/56* (2006.01)
*H04M 15/06* (2006.01)
(Continued)

(52) U.S. Cl.
CPC ............. *H04M 3/436* (2013.01); *G10L 25/51* (2013.01)

(58) Field of Classification Search
USPC ............. 379/142.01, 207.04, 207.05, 207.16
See application file for complete search history.

(56) References Cited

U.S. PATENT DOCUMENTS

2006/0182247 A1*   8/2006   Batni ................ H04M 3/42017
                                                              379/189
2007/0064906 A1*   3/2007   Jain ................... H04M 3/42042
                                                              379/207.05
(Continued)

FOREIGN PATENT DOCUMENTS

KR   10-2006-0099264          9/2006
KR      20060099264 A  *      9/2006
(Continued)

*Primary Examiner* — Quoc D Tran
(74) *Attorney, Agent, or Firm* — Lex IP Meister, PLLC

(57) ABSTRACT

An apparatus provides a method for analyzing a situation of a called terminal based on a sound source provided by a telecommunication service provider. The method includes storing feature informations of situation guidance sound sources provided by telecommunication service providers according to the situation of the called terminal; after a call connection request to a called terminal, receiving a sound source provided by a telecommunication service provider according to a situation of the called terminal; extracting at least one analysis duration of the received sound source with reference to a beep/tone of the received sound source, corresponding to feature informations of at least one candidate sound source among the situation guidance sound sources; and determining a situation of the called terminal based on a matching degree of the received sound source and the candidate sound source relating to a corresponding analysis duration, for respective analysis durations.

19 Claims, 14 Drawing Sheets

```
START DETECTION - NexWill Corp.

READ MOBILE CALL PATTERN

[SKBUSY] -1S
[KTBUSY] 76
[LGBUSY] -1S
[SKOFF] 9
[KTOFF] -1S
[LGOFF] 5
[SKREJ] 7
[KTREJ] -1F
[LGREJ] 5

KTMobile BUSY DETECT .
```

(51) Int. Cl.
    *H04M 3/42*     (2006.01)
    *H04M 3/436*     (2006.01)
    *G10L 25/51*     (2013.01)

(56) References Cited

U.S. PATENT DOCUMENTS

2009/0214003 A1*    8/2009    Yan .................. H04M 3/02
    379/87
2014/0087700 A1*    3/2014    Gudlavenkatasiva .. H04W 4/16
    455/413

FOREIGN PATENT DOCUMENTS

| KR | 10-2006-0134392 | | 12/2006 |
|----|-----------------|---|---------|
| KR | 10-2010-0036807 | | 4/2010 |
| KR | 10-2010-0126104 | | 12/2010 |
| KR | 20100126104 A | * | 12/2010 |
| KR | 10-2014-0047341 | | 4/2014 |

* cited by examiner

FIG. 9

```
START DETECTION - NexWill Corp.
READ MOBILE CALL PATTERN

[SKBUSY] -1S
[KTBUSY] 76
[LGBUSY] -1S
[SKOFF] 9
[KTOFF] -1S
[LGOFF] 5
[SKREJ] 7
[KTREJ] -1F
[LGREJ] 5

KTMobile BUSY DETECT .
```

METHOD AND APPARATUS FOR ANALYZING SITUATION OF CALLED TERMINAL, AND PROGRAM FOR IMPLEMENTING THE SAME

TECHNICAL FIELD

The present invention relates to a method and apparatus for analyzing situation of called terminal, and a program for implementing the same.

BACKGROUND ART

When a calling terminal inputs a telephone number of a called terminal, a wired telephone network or a mobile communication network requests a call to the called terminal. When the called terminal accepts the call, a call is connected between the calling terminal and the called terminal. If the called terminal is busy, the called terminal is turned off, or a user of the called terminal rejects a call, the call is not connected, and a guidance sound source established by a telecommunication service provider on the side of the called terminal is transmitted to the calling terminal.

For the purpose of efficient management, a company calling a plurality of users in a like manner of a call center uses a calling device for telephoning the called terminal, and when the called terminal responds to it, it is connected to a call center agent so that the same may respond to the called party.

The conventional calling device receives sound source data for notifying a situation of the called terminal for each frame in real time. In this instance, the conventional calling device detects a starting point of the sound source, and analyzes, by comparing patterns and recognizing voice, sound source data after the starting point to determine the situation of the called terminal. Therefore, analysis errors may be influenced according to performance of a starting point detector. And when initial received data are lost, the conventional calling device recognizes a middle point of the actual sound source as the starting point. So it cannot accurately analyze the situation of the called terminal because of asynchronization of a reference sound source and a received sound source. When the called party rejects a call, the sound source provided by the telecommunication service provider comes to each called terminal after an individually established ring back tone. So it is difficult for the conventional device that analyzes the sound source with reference to the starting point to analyze the call rejection situation of the called terminal. Further, the conventional device recognizes the voice (e.g., busy) included in the received data to analyze the situation of the called terminal so there is a large amount of calculation for voice recognition.

DISCLOSURE

Technical Problem

The present invention has been made in an effort to provide a method and device for analyzing a situation of a called terminal based on a specific sound source (e.g., beep/tone) provided by a telecommunication service provider, and a program for implementing the same.

Technical Solution

An exemplary embodiment of the present invention provides a method for analyzing, by an apparatus, a situation of a called terminal based on a sound source provided by a telecommunication service provider. The method includes storing feature informations of situation guidance sound sources provided by telecommunication service providers according to the situation of the called terminal; after a call connection request to a called terminal, receiving a sound source provided by a telecommunication service provider according to a situation of the called terminal; extracting at least one analysis duration of the received sound source with reference to a beep/tone of the received sound source, corresponding to feature informations of at least one candidate sound source among the situation guidance sound sources; and determining a situation of the called terminal based on a matching degree of the received sound source and the candidate sound source relating to a corresponding analysis duration, for respective analysis durations.

The feature informations may include position information where a core sound source of a corresponding situation guidance sound source exists, length information of the core sound source, and a voice pattern of the core sound source with reference to a beep/tone of respective situation guidance sound sources.

The analysis duration of the received sound source may be a position corresponding to a core sound source of the respective candidate sound sources, with reference to a beep/tone of the received sound source.

The determining of a situation of the called terminal may include comparing voice patterns of respective analysis durations of the received sound source and at least one candidate sound source relating to the corresponding analysis duration; calculating matching degrees of the received sound source and the at least one candidate sound source based on a comparison result; and determining the situation of the called terminal based on each matching degree of the at least one candidate sound source.

The extracting of at least one analysis duration may include extracting a position corresponding to feature informations of the situation guidance sound sources from the received sound source as a candidate analysis duration, based on feature informations of the situation guidance sound sources; when a first candidate analysis duration relating to a first situation guidance sound source is a silent syllable duration, excluding the first situation guidance sound source from the candidate sound source; and when a second candidate analysis duration relating to a second situation guidance sound source is provided before a starting point of the received sound source, excluding the second situation guidance sound source from the candidate sound source.

The situation guidance sound sources may include sound sources for notifying at least one situation of busy, turn-off, call rejection, overseas roaming, and an unknown number.

Another embodiment of the present invention provides a method for analyzing, by an apparatus, a situation of a called terminal based on a sound source provided by a telecommunication service provider. The method includes storing first feature informations of at least one first situation guidance sound sources, wherein the first feature informations are extracted with reference to a starting point of the at least one first situation guidance sound source; storing second feature informations of at least one second situation guidance sound source, wherein the second feature informations are extracted with reference to a beep/tone of the at least one second situation guidance sound source; receiving a received sound source provided by a telecommunication service provider according to a situation of a called terminal; determining whether the received sound source corresponds to one of the first situation guidance sound sources, by comparing the received sound source and the first feature informations of the first situation guidance sound sources with reference to a starting point of the received sound source; and when the received sound source does not correspond to one of the first situation guidance sound sources, determining whether the received sound source corresponds to one of the second situation guidance sound sources, by comparing the received sound source and the second feature informations of the second situation guidance sound sources with reference to a beep/tone of the received sound source.

The second situation guidance sound source may include a beep/tone. The first situation guidance sound source may not include a beep/tone among the situation guidance sound sources of the called terminal provided by at least one telecommunication service provider.

The first feature informations of the first situation guidance sound source may include position information where a core sound source of the first situation guidance sound source exists, length information of the core sound source, and a voice pattern of the core sound source with reference to a starting point of the first situation guidance sound source.

The determining whether the received sound source corresponds to one of the first situation guidance sound sources may include extracting an analysis duration corresponding to the first feature informations of the first situation guidance sound sources from the received sound source with reference to a starting point of the received sound source; and determining a situation of the called terminal based on a matching degree of the received sound source and a first situation guidance sound source relating to the corresponding analysis duration for respective analysis durations.

The second feature informations of the second situation guidance sound source may include position information where a core sound source of the second situation guidance sound source exists, length information of the core sound source, and a voice pattern of the core sound source with reference to a beep/tone of the second situation guidance sound source.

The determining whether the received sound source corresponds to one of the second situation guidance sound sources may include extracting an analysis duration corresponding to the second feature informations of the respective second situation guidance sound sources from the received sound source with reference to a beep/tone of the received sound source; and determining a situation of the called terminal based on a matching degree of the received sound source and a second situation guidance sound source relating to the corresponding analysis duration for respective analysis durations.

The determining whether the received sound source corresponds to one of first situation guidance sound sources may include calculating a matching score of the received sound source and the first feature informations of the respective first situation guidance sound sources; and when the matching score of a specific situation guidance sound source among the first situation guidance sound sources is equal to or greater than a reference value, determining the received sound source to be the specific situation guidance sound source.

The determining whether the received sound source corresponds to one of the second situation guidance sound sources may include calculating a matching score of the received sound source and the second feature informations of the respective second situation guidance sound sources; and when the matching score of a specific situation guidance sound source among the second situation guidance sound sources is equal to or greater than a reference value, determining the received sound source to be the specific situation guidance sound source.

Yet another embodiment of the present invention provides a program stored in a computer-readable recording medium and executed by hardware including a processor, a memory device, a speaker, and a display of a user terminal. The program includes requesting a call connection to a called terminal; extracting a beep/tone from a received sound source provided by a telecommunication service provider according to a situation of the called terminal; extracting at least one analysis duration of the received sound source with reference to a beep/tone of the received sound source, corresponding to feature informations of at least one candidate sound source among a plurality of situation guidance sound sources; and determining a situation of the called terminal based on a matching degree of the received sound source and a candidate sound source relating to the corresponding analysis duration for respective analysis durations. The feature informations include position information where a core sound source of the corresponding situation guidance sound source exists, length information of the core sound source, and a voice pattern of the core sound source with reference to a beep/tone of respective situation guidance sound sources.

The program may further include, when the received sound source is determined to be one of a busy-state guidance sound source, a turn-off guidance sound source, a call rejection guidance sound source, an unknown number guidance sound source, and an overseas roaming guidance sound source according to a result of determining the situation of the called terminal, notifying that the called terminal is in a situation that corresponds to the determined guidance sound source through at least one of the speaker and the display.

The program may further include, when the called terminal is in one of a busy situation, a turn-off situation, a call rejection situation, an unknown number situation, and an overseas roaming situation, calling back to the called terminal or transmitting a text message to the called terminal according to a rule established for the corresponding situation; and when the called terminal does not answer, calling back to the called terminal or transmitting a text message to the called terminal according to a rule established for the no-answer situation. A context of the text message is different according to a transmitting situation.

The requesting of a call connection to the called terminal may include, when attempting the call connection while a specific application is running in the user terminal, outputting content of the specific application to at least one of the speaker and the display while the call connection is attempted; and when the call is connected, stopping the running of the specific application, and outputting data received from the called terminal to at least one of the speaker and the display.

The extracting of a beep/tone from the received sound source may include determining whether the received sound source includes an additional situation guidance sound source that is different from the plurality of situation guidance sound sources with reference to a starting point of the received sound source, until a beep/tone is detected from the received sound source; when the beep/tone is detected in the received sound source while determining whether the received sound source includes the additional situation guidance sound source, stopping the determining of whether the received sound source includes the additional situation guidance sound source, and going to the extracting of at least one analysis duration corresponding to feature informations of at least one candidate sound source; and when the received sound source is determined to include the additional situation guidance sound source before the beep/tone is detected from the received sound source, stopping detecting of a beep/tone, and outputting a situation of the called terminal corresponding to the additional guidance sound source included in the received sound source. The program may further include, when the received sound source does not correspond to one of the plurality of situation guidance sound sources and the additional situation guidance sound source, determining the called terminal to be in a no-answer situation.

Yet another embodiment of the present invention provides a program stored in a computer-readable recording medium and executed by hardware including a processor, a memory device, a speaker, and a display of a user terminal. The program includes requesting a call connection to a called terminal; analyzing a received sound source provided by a telecommunication service provider according to a situation of the called terminal to determine the situation of the called terminal; and when a call is not connected according to a result of determining the situation of the called terminal, outputting information for notifying at least one of the speaker and the display of the situation of the called terminal.

The program may further include retransmitting to the called terminal or a transmitting a text message thereto according to a method established for the respective situations of the called terminal. The situation of the called terminal may be one of a busy situation, a turn-off situation, a call rejection situation, an unknown number situation, and an overseas roaming situation.

The determining of a situation of the called terminal may include extracting at least one analysis duration corresponding to feature informations of at least one first candidate sound source from among first situation guidance sound sources from the received sound source with reference to a starting point of the received sound source; determining a situation of the called terminal based on a matching degree of the received sound source and the first candidate sound source relating to the corresponding analysis duration for respective analysis durations; extracting at least one analysis duration corresponding to feature informations of at least one second candidate sound source from among second situation guidance sound sources from the received sound source with reference to a beep/tone of the received sound source; determining a situation of the called terminal based on a matching degree of the received sound source and the second candidate sound source relating to the corresponding analysis duration for respective analysis durations; and when the first situation guidance sound sources and the second situation guidance sound sources have no corresponding sound source according to a result of analyzing the received sound source, determining the situation of the called terminal to be a no-answer situation.

Advantageous Effects

According to an exemplary embodiment of the present invention, various situations of the called terminal may be detected without errors with low computation. According to an exemplary embodiment of the present invention, it may be determined whether the telecommunication service provider has changed the situation guidance sound source.

According to an exemplary embodiment of the present invention, the waiting time for a call connection may be reduced, and the unnecessarily wasted time because of a call disconnection may be removed. According to an exemplary embodiment of the present invention, when the user makes a phone call while content or an application is running in the user's terminal, he does not need to stop the content or the application being performed. According to an exemplary embodiment of the present invention, the analyzing device or the user terminal may analyze the situation of the called terminal, may call back according to the situation of the called terminal, or may transmit text messages thereby increasing convenience for the user.

DESCRIPTION OF THE DRAWINGS

FIG. 9 exemplifies a situation analysis result of a called terminal according to an exemplary embodiment of the present invention.

MODE FOR INVENTION

Figure 1:
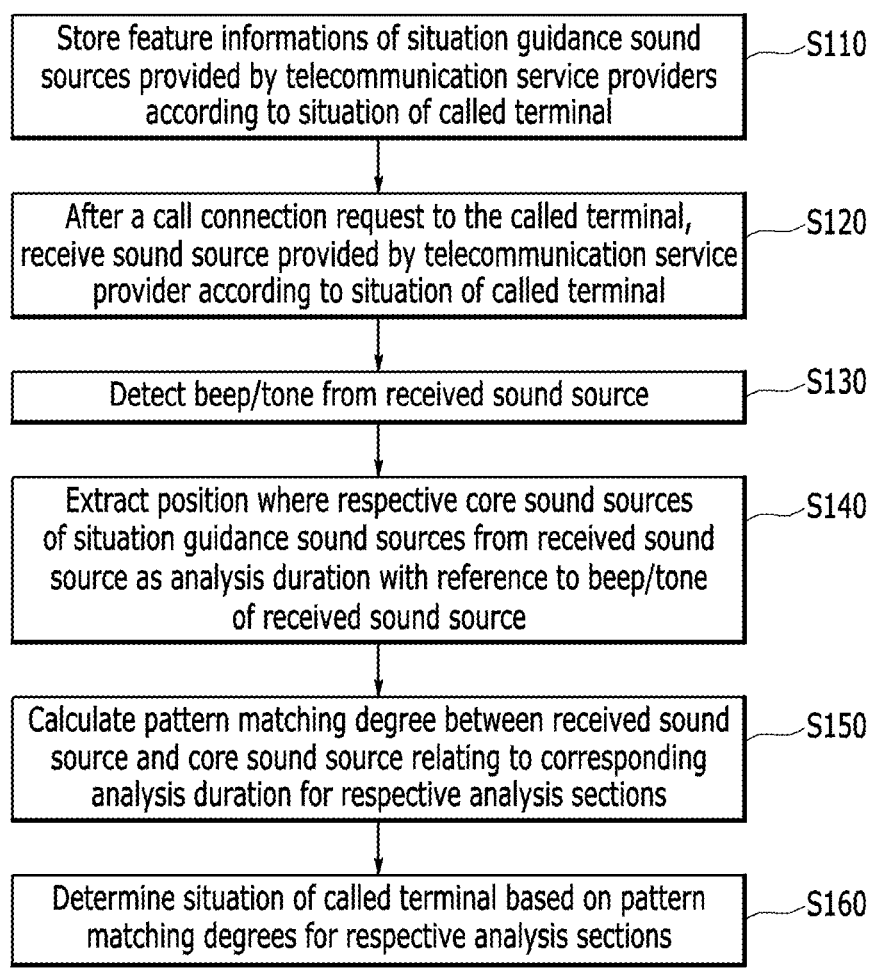
FIG. 1 shows a flowchart of a method for analyzing a situation of a called terminal according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Unless explicitly described to the contrary, the word "comprise" and variations such as "comprises" or "comprising" will be understood to imply the inclusion of stated elements but not the exclusion of any other elements.

Figure 2:
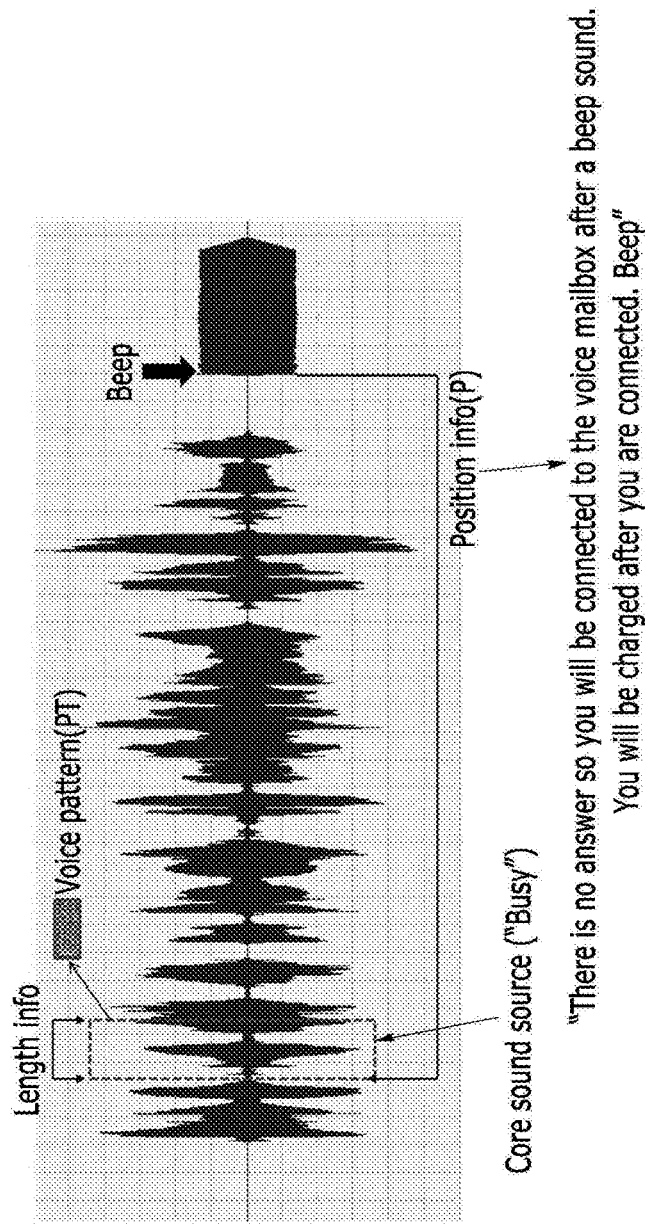
FIG. 2 shows a method for extracting feature informations of a sound source according to an exemplary embodiment of the present invention.
Figure 3:
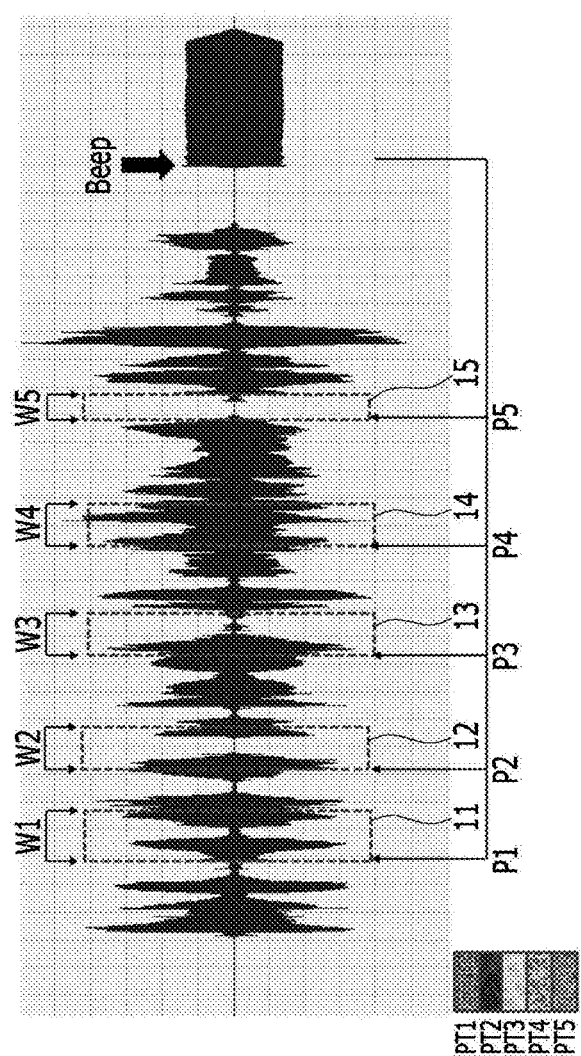
FIG. 3 shows a method for analyzing a situation of a called terminal according to an exemplary embodiment of the present invention.
Figure 4:
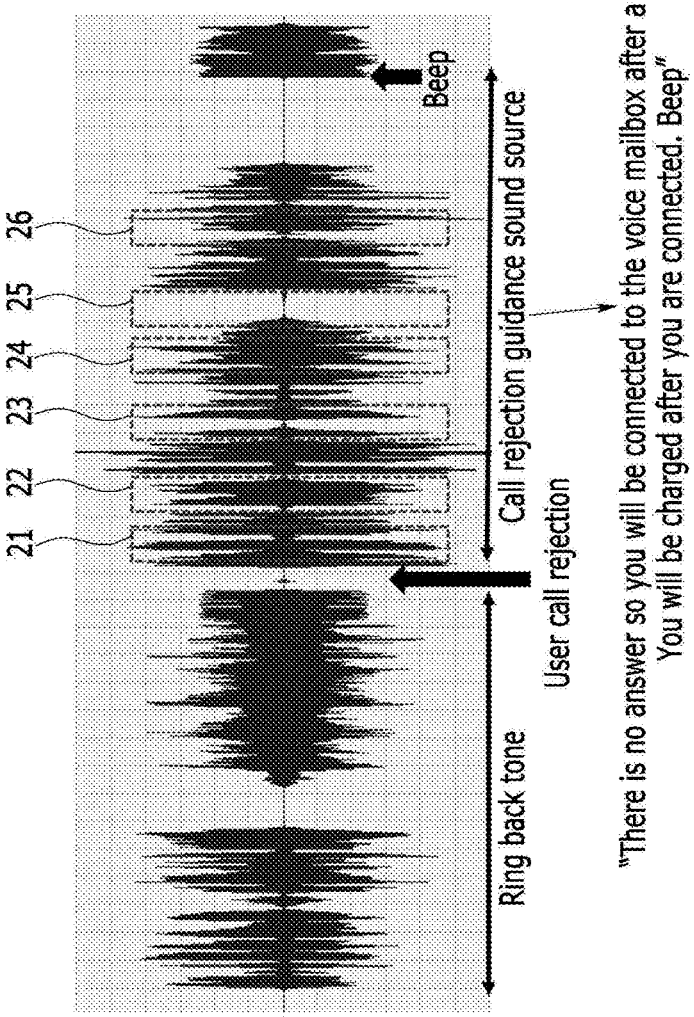
FIG. 4 and FIG. 5 respectively show a method for analyzing a call rejection situation of a called terminal according to an exemplary embodiment of the present invention.
Figure 5:
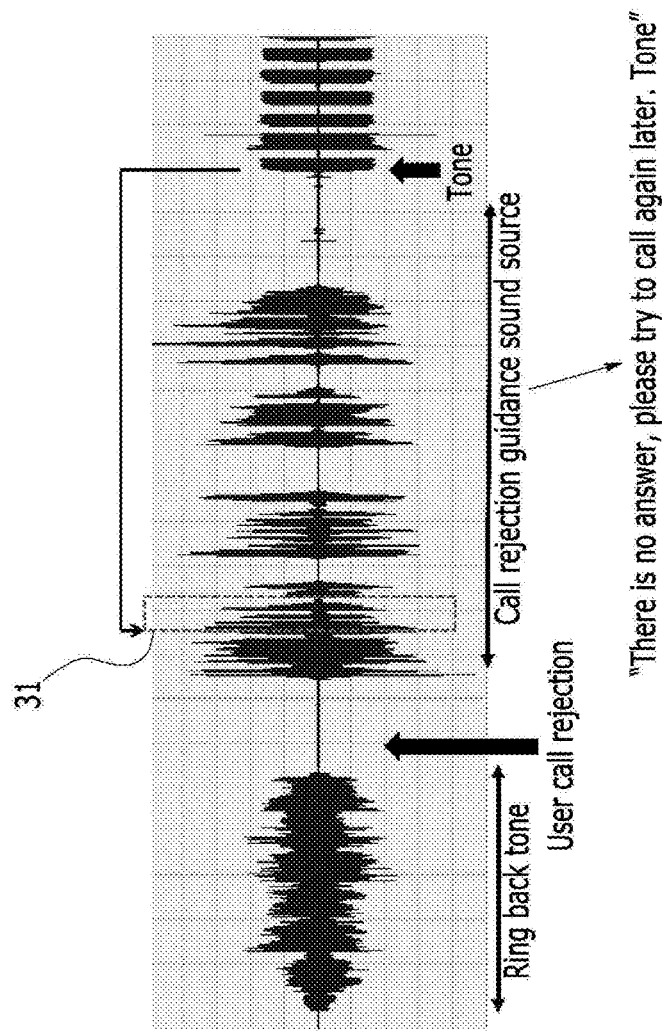

FIG. 1 shows a flowchart of a method for analyzing a situation of a called terminal according to an exemplary embodiment of the present invention, FIG. 2 shows a method for extracting feature informations of a sound source according to an exemplary embodiment of the present invention, FIG. 3 shows a method for analyzing a situation of a called terminal according to an exemplary embodiment of the present invention, and FIG. 4 and FIG. 5 respectively show a method for analyzing a call rejection situation of a called terminal according to an exemplary embodiment of the present invention.

Referring to FIG. 1, a situation analyzing device (referred to as an analyzing device) 100 (see FIG. 13) of a called terminal stores feature informations of situation guidance sound sources provided by telecommunication service providers according to a situation of the called terminal (S110). For example, as expressed in Table 1, after a call connection request to a called terminal, respective telecommunication service providers provide different sound sources depending on the situations of the called terminal, such as, when the called terminal is busy, when the called terminal is turned off, or when called terminal rejects the call.

TABLE 1

| Telecommunication service providers | Classify | Called terminal's situations |
|---|---|---|
| "S" company | S1 | Busy |
|  | S2 | Off |
|  | S3 | Reject |
| "K" company | S4 | Busy |
|  | S5 | Off |
|  | S6 | Reject |
| "L" company | S7 | Busy |
|  | S8 | Off |
|  | S9 | Reject |

The analyzing device 100 extracts feature informations of respective situation guidance sound sources with reference to a beep/tone included in the sound source. Referring to FIG. 2, the analyzing device 100 may extract the beep/tone from the sound source including the beep/tone, and may store position information (P) where a core sound source of a situation guidance sound source exists with reference to the beep/tone, length information (W) of the core sound source, and a voice (speech) pattern (PT) of the core sound source as feature informations. For example, when the called terminal of a subscriber of the "S" company is busy, the analyzing device 100 may receive "The line is busy. It will be connected to the voice mailbox after a beep sound, and you will be charged. Beep". The analyzing device 100, as shown in FIG. 2, may store position information (P) where a core sound source (e.g., a sound source corresponding to "busy") exists, length information (W) of the core sound source, and a voice pattern (PT) of the core sound source from the beep as feature informations of a busy-state guidance sound source of the "S" company. The core sound source may be established in various ways for the respective sound sources.

The analyzing device 100, after a call connection request to the called terminal, receives the sound source provided by the telecommunication service provider according to the situation of the called terminal (S120).

The analyzing device 100 detects the beep/tone from the received sound source (S130).

The analyzing device 100 extracts the position where the respective core sound sources of the situation guidance sound sources from the received sound source as an analysis duration with reference to the beep/tone of the received sound source (S140). For example, when the analyzing device 100 receives the sound source as shown in FIG. 3, the analyzing device 100 extracts analysis durations (e.g., 11, 12, 13, 14, and 15) where the core sound source of at least one situation guidance sound source (referring to the situations S1-S9 of Table 1) exists from the received sound source. Here, at least one sound source of the situation guidance sound sources (S1-S9) is a candidate sound source. For example, when the core sound source of the situation guidance sound source S1 is provided on a position of P1 from the beep, the length of the core sound source is W1, and the voice pattern of the core sound source is PT1, the analyzing device 100 extracts the duration W1 provided on the position of P1 from the beep of the received sound source as the analysis duration 11 corresponding to the situation guidance sound source S1.

The analyzing device 100 calculates a pattern matching degree between the received sound source and the core sound source relating to the corresponding analysis duration for respective analysis durations (S150). Methods for determining whether the two sound sources match each other may be various, and here, a method for comparing patterns of the sound sources will be described. For example, the analysis duration 11 corresponds to the core sound source of the situation guidance sound source S1, so the analyzing device 100 compares patterns of the received sound source of the analysis duration 11 and the core sound source of the situation guidance sound source S1. If the analysis duration 12 corresponds to the core sound source of the situation guidance sound source S2, the analyzing device 100 compares patterns of the received sound source of the analysis duration 12 and the core sound source of the situation guidance sound source S2. That is, when the received sound source is a busy-state guidance sound source of the "S" company, the core sound source of the situation guidance sound source S1 will be provided in the analysis duration 11, and when it is not the busy-state guidance sound source of the "S" company, the core sound source of the situation guidance sound source S1 will not be provided in the analysis duration 11.

The analyzing device 100 determines the situation of the called terminal based on the pattern matching degrees for respective analysis durations (S160). That is, when the received sound source is the busy-state guidance sound source of the "S" company, the core sound source (e.g. "busy") of the busy-state guidance sound source S1 exists in the analysis duration 11, a sound source that is different from the core sound source (e.g. "off") of a turn-off guidance sound source S2 may exist in the analysis duration 12. Therefore, when the pattern matching degree of the received sound source and the core sound source is high in the analysis duration 11 compared to another analysis duration, the analyzing device 100 determines the called terminal of the subscriber of the "S" company to be busy.

As described, the analyzing device 100 does not perform voice recognition from the starting point of the sound source or search the core sound source provided in a constant distance from the starting point of the sound source, but searches the core sound source starting back from the beep/tone. Therefore, the analyzing device 100 may distinguish the sound source regardless of performance of a starting point detector, and it may accurately analyze the situation of the called terminal when initial received data are lost or a sound source is added to a head portion of the situation guidance sound source.

FIG. 4 shows an example of a sound source in a call rejection situation S9 of the "S" company. During a call connection request, when a ring back tone is reproduced for a time and the user rejects the call, a call rejection situation guidance voice "There is no answer so you will be connected to a voice mail box after a beep sound. You will be charged after you are connected." comes out for a predetermined time, and a beep sounds. A call rejection situation guidance voice is reproduced after a ring back tone established in various ways for each called terminal. So unless the conventional device for analyzing the pattern of the sound source with reference to the starting point analyzes the entire sound sources including a ring back tone to recognize a voice, such as "There is no answer", it is difficult to recognize the call rejection situation guidance voice after the ring back tone is established in various ways for each the called terminal.

To solve this limit, the analyzing device 100 finds a beep from the received sound source, and extracts the analysis durations (e.g. 21-26) that are separated from the beep by a constant distance based on position and length information from the beep of the core sound sources. The analyzing device 100 compares a pattern of a candidate sound source corresponding to the sound source of analysis durations. The core sound source in the sound source of the call rejection situation S9 of the "L" company exists in a duration that is separated from the beep sound by a constant distance irrespective of the ring back tone, so the analyzing device 100 may know that the called terminal is in a call rejection situation.

FIG. 5 exemplifies a sound source of a call rejection situation S6 of the "K" company. During a call connection request, when the ring back tone is reproduced for a predetermined time and the user rejects the call, a call rejection situation guidance voice "There is no answer, please try to call again later" is reproduced for a predetermined time, and a tone is generated.

The analyzing device 100 finds the tone from the received sound source, and compares patterns of the sound source of the analysis durations that are separated from the tone by a constant distance and the candidate sound source corresponding to the analysis durations. In this instance, the call rejection situation S6 of the "K" company includes a tone, differing from other situations. Therefore, the analyzing device 100 may analyze the received sound source by using feature informations 31 of the situation guidance sound source (e.g. a call rejection guidance sound source of the "K" company) including a tone.

Figure 6:
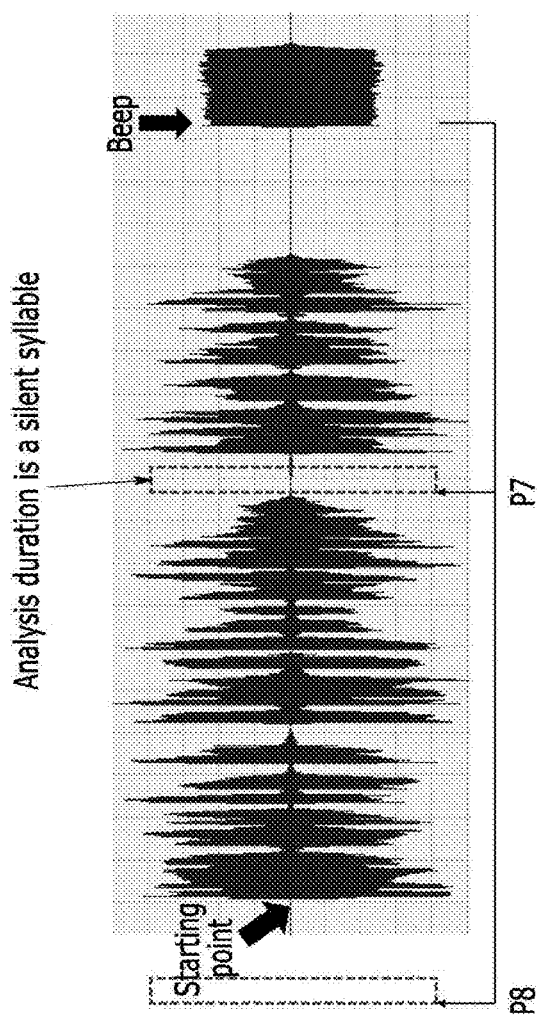
FIG. 6 shows a method for extracting an analysis duration according to an exemplary embodiment of the present invention.

FIG. 6 shows a method for extracting an analysis duration according to an exemplary embodiment of the present invention.

Referring to FIG. 6, the analyzing device 100 extracts the analysis durations corresponding to the core sound source of the situation information sound sources from the received sound source with reference to the beep/tone of the received sound source. In this instance, the analyzing device 100 may not perform a pattern analysis by determining all situation guidance sound sources (S1-S9) as candidate sound sources, but may select candidate sound sources based on information of the received sound source.

For example, the core sound source of the situation guidance sound source S7 is assumed to be separated from the beep by P7 with a length of W7. However, when the point that is separated from the beep of the received sound source by P7 is a silent syllable, the analyzing device 100 does not need to compare the pattern of the core sound source of the situation guidance sound source S7 and the silent syllable duration. Therefore, the analyzing device 100 excludes the situation guidance sound source S7 from the candidate sound source.

The core sound source of the situation guidance sound source S8 is assumed to exist from the beep by P8 with a length of W8. However, when the point that is separated from the beep of the received sound source by P8 is in advance of the starting point of the received sound source, there is no received sound source to be compared. Therefore, the analyzing device 100 excludes the situation guidance sound source S8 from the candidate sound source.

As described, the analyzing device 100 may determine whether the analysis duration is a silent syllable duration, whether the analysis duration is before the sound source is received, or whether the received sound source includes a beep or a tone to reduce the candidate of the situation guidance sound source and resultantly reduce a calculation amount.

Figure 7:
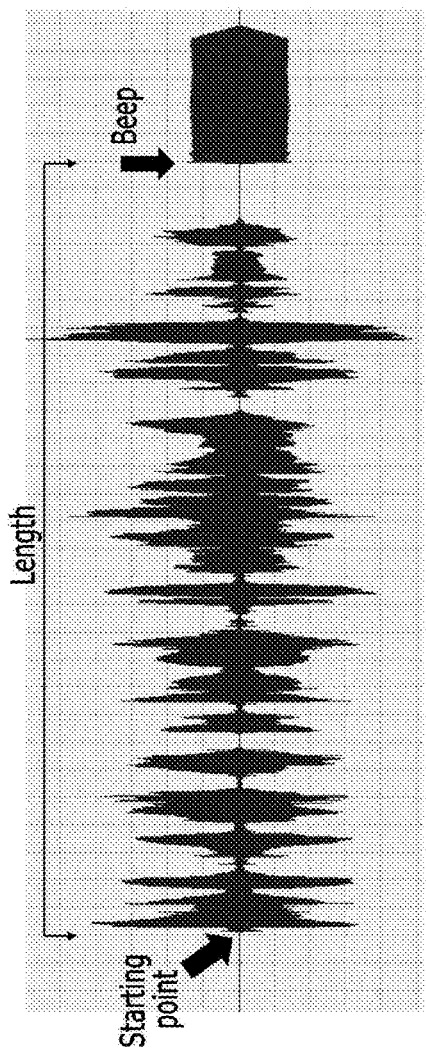
FIG. 7 shows a method for detecting a length of a received sound source according to an exemplary embodiment of the present invention.
Figure 8:
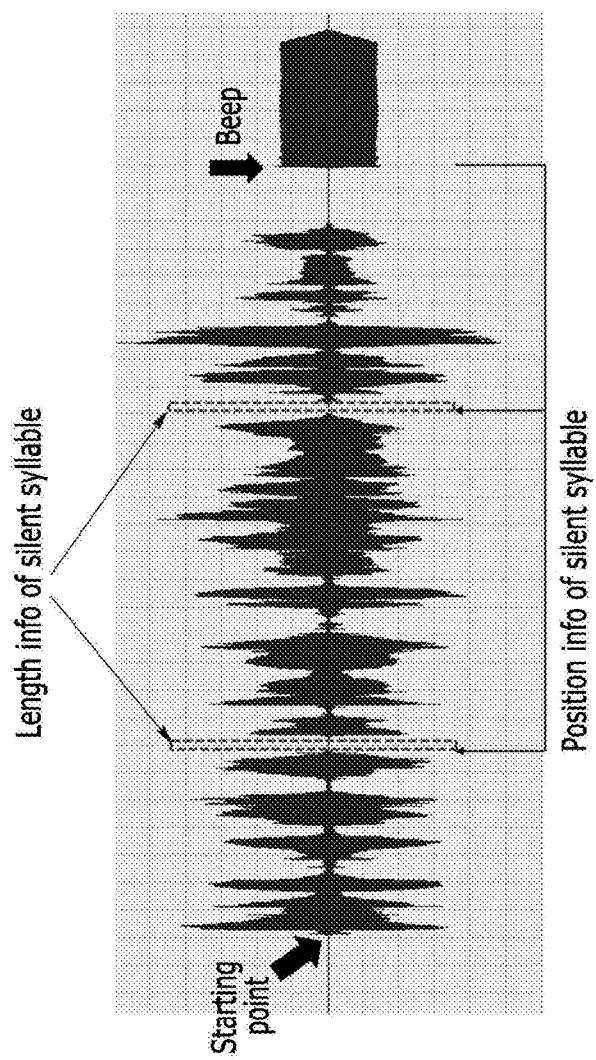
FIG. 8 shows a method for detecting a silent syllable duration according to an exemplary embodiment of the present invention.

FIG. 7 shows a method for detecting a length of a received sound source according to an exemplary embodiment of the present invention, and FIG. 8 shows a method for detecting a silent syllable duration according to an exemplary embodiment of the present invention.

Referring to FIG. 7, the analyzing device 100 extracts the starting point and the beep/tone for each received sound source, and calculates a length from the beep/tone to the starting point of the sound source. The analyzing device 100 may store the length of the sound source as feature informations of the corresponding situation guidance sound source.

The analyzing device 100 analyzes the received sound source, senses the starting point and the beep, and calculates the length of the received sound source. The analyzing device 100 may compare lengths of a plurality of situation guidance sound sources provided by a plurality of telecommunication service providers and the length of the received sound source to determine the situation of the called terminal. When the lengths of the situation guidance sound sources are different, the analyzing device 100 may compare sound source length information to easily determine the situation of the called terminal.

Referring to FIG. 8, the analyzing device 100 may extract the beep/tone for each received sound source, and may store position information in which at least one silent syllable exists, as well as length information of the silent syllable from the beep/tone as feature informations of the corresponding situation guidance sound source.

The analyzing device 100 may compare length and silent syllable duration information of the situation guidance sound sources and the received sound source to determine the situation of the called terminal.

FIG. 9 exemplifies a situation analysis result of a called terminal according to an exemplary embodiment of the present invention.

Referring to FIG. 9, the analyzing device 100 analyzes the situation of the called terminal based on feature informations of the situation guidance sound sources (e.g. S1-S9). The feature informations may use position information in which the core sound source of the situation guidance sound source exists, length information of the core sound source, a voice pattern of the core sound source, a length of the situation guidance sound source, and silent syllable duration information of the situation guidance sound source from the beep/tone.

The analyzing device 100 extracts the analysis duration in which the core voice of each situation guidance sound source exists from the received sound source based on feature informations (the position and duration where the core sound source exists) of each candidate sound source. The analyzing device 100 may output the pattern matching degree between the sound source extracted from each analysis duration and the candidate sound source relating to the corresponding analysis duration as a score. As the score becomes higher, a possibility that the pattern of the candidate sound source may exist in the analysis duration of the received sound source becomes higher.

For example, when the pattern matching score between a KTBUSY situation guidance sound source (e.g., the sound source received when the KT called terminal is busy) and the received sound source is the highest, the analyzing device 100 detects (KTMobile BUSY DETECT) that the called terminal that is a KT subscriber is busy.

The analyzing device 100 extracts the analysis duration corresponding to the core sound source of a certain situation guidance sound source from the received sound source with reference to the beep/tone of the received sound source, and this analysis duration may be a silent syllable duration. Then, the analyzing device 100 does not need to determine the pattern matching state for the analysis duration. Instead, the analyzing device 100 may exclude the guidance sound source (SKBUSY/LGBUSY/KTOFF) from the candidate sound source, and may output information (e.g. −1S) for indicating that the analysis duration corresponding to the core sound source of the situation guidance sound sources (SKBUSY/LGBUSY/KTOFF) is a silent syllable duration.

The analyzing device 100 extracts the analysis duration corresponding to the core sound source of a certain situation guidance sound source from the received sound source with reference to the beep/tone of the received sound source, and the analysis duration may be a point provided in advance to the starting point of the received sound source. The analyzing device 100 does not need to determine the pattern matching state on the analysis duration. Instead, the analyzing device 100 may exclude the situation guidance sound source (KTREJ) from the candidate sound source, and may output information (e.g. −1F) for showing that the analysis duration corresponding to the core sound source of the situation guidance sound source (KTREJ) represents a case that has left a border of a calling starting point in the received sound source.

Figure 10:
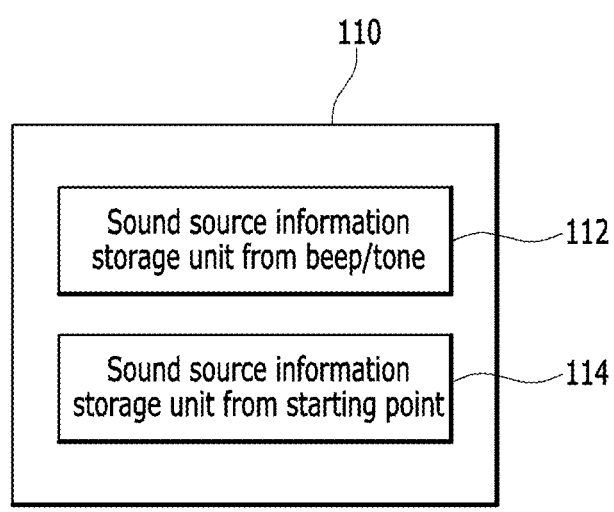
FIG. 10 shows a sound source information storage unit according to an exemplary embodiment of the present invention.
Figure 11:
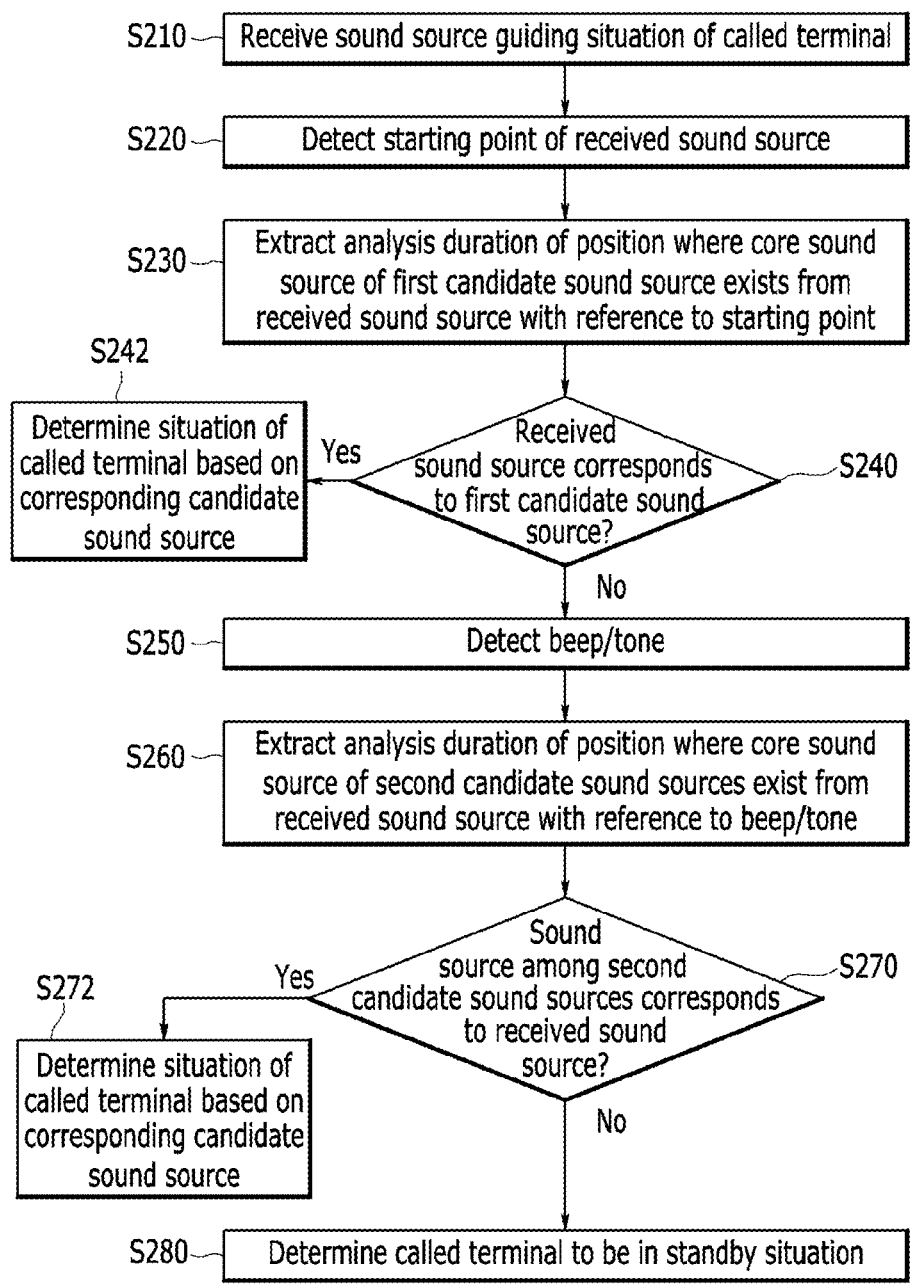
FIG. 11 shows a flowchart of a method for analyzing a situation of a called terminal according to another exemplary embodiment of the present invention.

FIG. 10 shows a sound source information storage unit according to an exemplary embodiment of the present invention. And FIG. 11 shows a flowchart of a method for analyzing a situation of a called terminal according to another exemplary embodiment of the present invention.

Referring to FIG. 10, the situation guidance sound source may be established in various ways by the telecommunication service provider. The situation guidance sound source for the case of busy/turn-off/call rejection includes a beep/tone. However, for example, when the called terminal is unknown or the called terminal cannot respond in a like manner of overseas roaming, the unknown/overseas roaming guidance sound source may not include a beep/tone.

Therefore, to analyze various situations of the called terminal without omission, the analyzing device 100 may extract the analysis duration corresponding to the core sound source of the situation guidance sound source with reference to the beep/tone of the received sound source, and may extract the analysis duration corresponding to the core sound source of the situation guidance sound source with reference to the starting point of the received sound source.

For this, the sound source information storage unit 110 includes a sound source information storage unit 112 from a beep/tone and a sound source information storage unit 114 from a starting point.

The sound source information storage unit 112 from a beep/tone stores position information where the core sound source exists, length information of the core sound source, and a voice pattern of the core sound source from the beep/tone as feature informations for respective situation guidance sound sources. The sound source information storage unit 112 from a beep/tone may further store a length (a sound source length) from the starting point to the beep/tone, and silent syllable duration information from the beep/tone for respective situation guidance sound sources.

The sound source information storage unit 114 from a starting point stores position information where the core sound source exists, length information of the core sound source, and a voice pattern of the core sound source from the starting point as feature informations for respective situation guidance sound sources. Particularly, the sound source information storage unit 114 from a starting point may store feature informations of the unknown number guidance sound source or the overseas roaming guidance sound source.

Referring to FIG. 11, the analyzing device 100 compares feature informations of the situation guidance sound sources stored in the sound source information storage unit and the received sound source to detect a situation of the called terminal.

The analyzing device 100 receives a sound source for noticing the situation of the called terminal (S210).

The analyzing device 100 detects the starting point of the received sound source (S220).

The analyzing device 100 extracts the analysis duration of the position where the core sound source of a first candidate sound source exists from the received sound source with reference to the starting point (S230). Here, the first candidate sound source may be a situation guidance sound source without a beep/tone, and for example, it may be an unknown number guidance sound source or an overseas roaming guidance sound source, and a first candidate sound source list may be changed according to the noticing method of the telecommunication service provider.

The analyzing device 100 compares the received sound source and the first candidate sound source relating to the corresponding analysis duration for respective analysis durations to determine whether they correspond to each other by equal to or greater than a reference value (S240).

When they correspond to each other by equal to or greater than a reference value, the analyzing device 100 determines the situation of the called terminal based on the corresponding candidate sound source (S242). For example, when the matching degree with the unknown number guidance sound source is high, the analyzing device 100 determines the telephone number of the called terminal to be unknown.

When they do not correspond to each other by equal to or greater than a reference value, the analyzing device 100 detects a beep/tone (S250). When the beep/tone is not detected, the analyzing device 100 determines it to be a calling standby situation.

The analyzing device 100 extracts the analysis duration of the position where the core sound source of a second candidate sound source exists from the received sound source with reference to the beep/tone (S260). Here, the second candidate sound source is a situation guidance sound source including a beep/tone, and for example, it may be a situation guidance sound source, such as busy, turn-off, or call rejection, and a second candidate sound source list may be changed according to a noticing method of the telecommunication service provider.

The analyzing device 100 compares the received sound source and the second candidate sound source relating to the corresponding analysis duration for respective analysis durations to extract candidate sound sources that correspond by equal to or greater than the reference value (S270). In another way, the analyzing device 100 may extract the candidate sound source with the highest pattern matching score from among the second candidate sound sources.

When the candidate sound source is extracted, the analyzing device 100 determines the situation of the called terminal based on the extracted candidate sound source (S272). For example, when the matching degree with the busy-state guidance sound source is high, the analyzing device 100 determines the called terminal to be currently busy.

When the candidate sound source is not extracted, the analyzing device 100 determines it to be a calling standby situation (S280). That is, the received sound source does not include the sound source that corresponds to the core sound source of the second candidate sound source, so the analyzing device 100 may determine it to be a calling standby situation in which the called terminal makes no response, and may wait for a call connection.

As described, the analyzing device 100 compares feature informations of the situation guidance sound sources stored in the sound source information storage unit and the received sound source to detect the situation of the called terminal, and a beep/tone may be detected before the first candidate sound source is determined. Therefore, the analyzing device 100 detects the starting point of the received sound source, and stands by for a detected state of the beep/tone. In this instance, while standing by for the detected state of the beep/tone, the analyzing device 100 extracts the analysis duration of the position where the core sound source of the first candidate sound source exists from the received sound source with reference to the starting point, and compares the received sound source and the first candidate sound source relating to the corresponding analysis duration for respective analysis durations to determine whether they correspond to each other by equal to or greater than a reference value.

If the received sound source is determined to be the first candidate sound source before the beep/tone is detected, the analyzing device 100 stops detecting the beep/tone. If the beep/tone is detected while it is determined whether the received sound source is the first candidate sound source or not, the analyzing device 100 stops the process for determining whether the received sound source is the first candidate sound source, and it goes to a process for determining whether the received sound source is a second candidate sound source.

Figure 12:
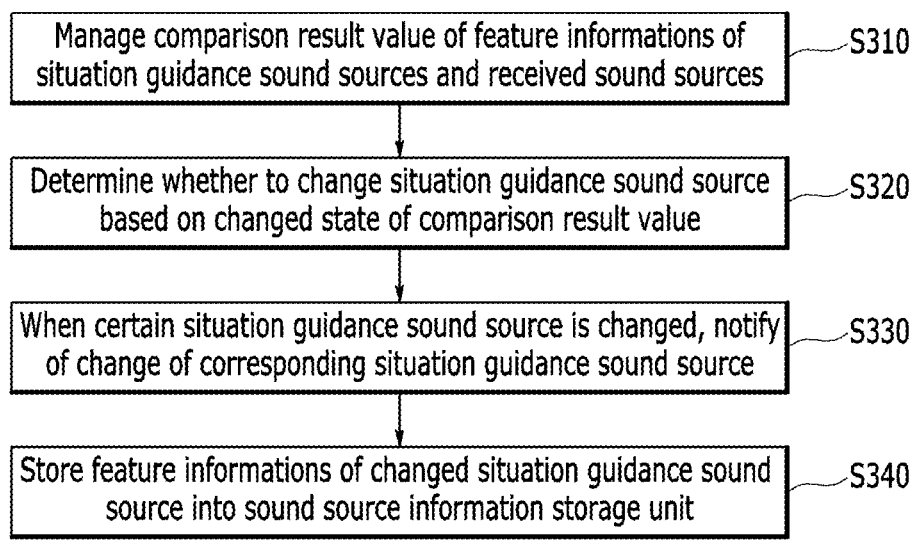
FIG. 12 shows a flowchart of a method for updating situation guidance sound source information according to an exemplary embodiment of the present invention.

FIG. 12 shows a flowchart of a method for updating situation guidance sound source information according to an exemplary embodiment of the present invention.

Referring to FIG. 12, the situation guidance sound source of the called terminal may be freely changed by the telecommunication service provider. If not knowing that the situation guidance sound source of the called terminal is changed, and failing to update the sound source information storage unit, it is difficult for the analyzing device 100 to accurately detect the situation of the called terminal. That is, the analyzing device 100 goes up in a reverse manner to find the position of the core sound source with reference to the beep/tone, so its performance is not influenced when an initial guidance voice or signal music is added or replaced. However, when there is a big change, such as when the situation guidance sound source is changed or a speaker is replaced, misrecognition is generated.

The analyzing device 100 manages comparison result values of feature informations of the situation guidance sound sources and the received sound sources (S310). The analyzing device 100 may store pattern matching scores of the situation guidance sound sources calculated for the respective received sound sources, and may manage sound source analysis results for the respective telecommunication service providers based on a plurality of received sound sources. Here, an additional monitoring device may manage the comparison result values of feature informations of the situation guidance sound sources stored in the sound source information storage unit 110 and the received sound sources.

The analyzing device 100 determines whether the situation guidance sound source is changed based on the changed state of the comparison result value (S320). For example, when the busy-state guidance sound source S4 of the "K" company is changed, the called terminal of the "K" company is busy but there is no pattern that corresponds to the received sound source, so a different pattern matching score is provided compared to the previous one. That is, referring to FIG. 9, when the called terminal is in a KTBUSY situation in a previous case, the KTBUSY situation guidance sound source is extracted as a matching sound source, and the pattern matching score is calculated to be around 76 points, so at a certain point of time, the pattern matching score of the KTBUSY situation may show a big deviation, or the KTBUSY situation may not be detected in various situation guidance sound sources. Then, the analyzing device 100 determines the KTBUSY situation guidance sound source to be changed.

When a certain situation guidance sound source is changed, the analyzing device 100 notifies of the change of the corresponding situation guidance sound source (S330).

The analyzing device 100 stores feature informations of the changed situation guidance sound source in the sound source information storage unit 110 (S340).

As described, the analyzing device 100 monitors the pattern matching score with the situation guidance sound sources for respective received sound sources to sense that there is a change in a calculation result of a specific situation guidance sound source. The analyzing device 100 may report the changed situation guidance sound source to the user. A user checks the changed situation guidance sound source, updates feature informations, and stores the same in the sound source information storage unit 110. In another way, the analyzing device 100 may receive the changed situation guidance sound source, may extract the core sound source (e.g. "busy") from the changed situation guidance sound source, and may extract feature informations with reference to the beep/tone.

The analyzing device 100 may analyze the comparison result value of feature informations of the situation guidance sound sources and the received sound sources to quickly sense the change of the sound source, thereby minimizing the blank space of the deterioration of performance.

It has been described that the analyzing device 100 includes a monitoring unit for monitoring the changing state of the situation guidance sound sources, and the monitoring unit may be implemented to be a separate device. The separately implemented monitoring unit may receive the comparison result value of feature informations of situation guidance sound sources and the received sound sources from a plurality of analyzing devices (including a user terminal) and may manage the same, and may transmit information on the change of the situation guidance sound sources or a control signal to a plurality of analyzing devices.

Figure 13:
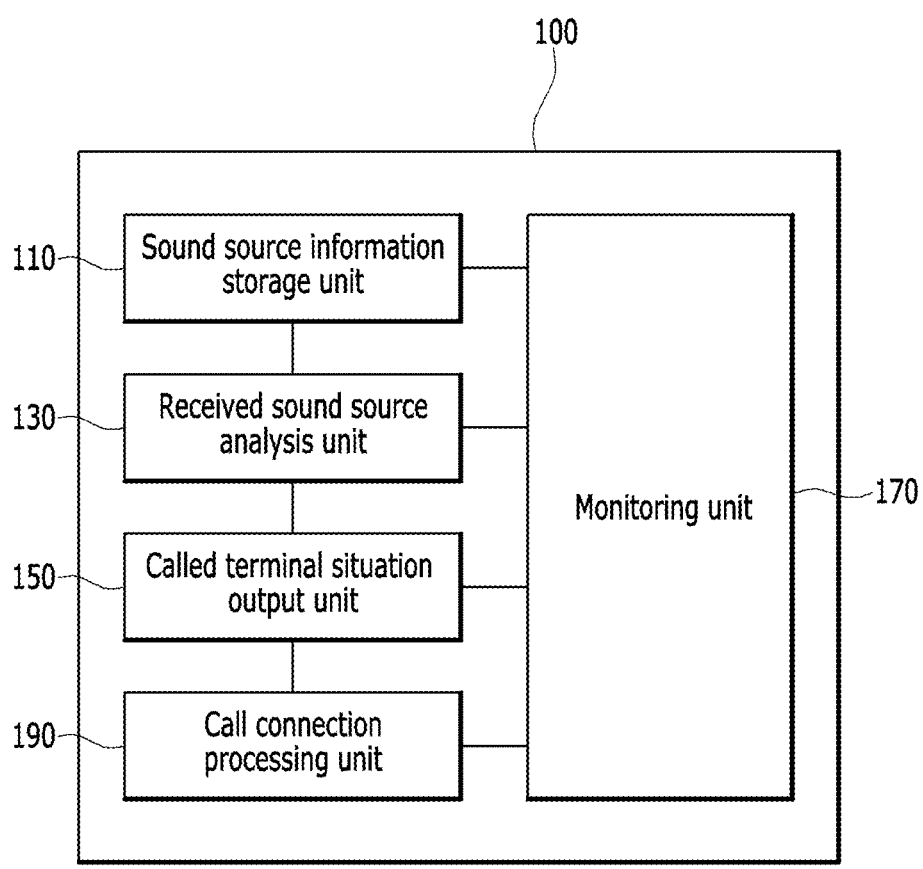
FIG. 13 shows a configuration diagram of a device for analyzing a situation of a called terminal according to an exemplary embodiment of the present invention.
Figure 14:
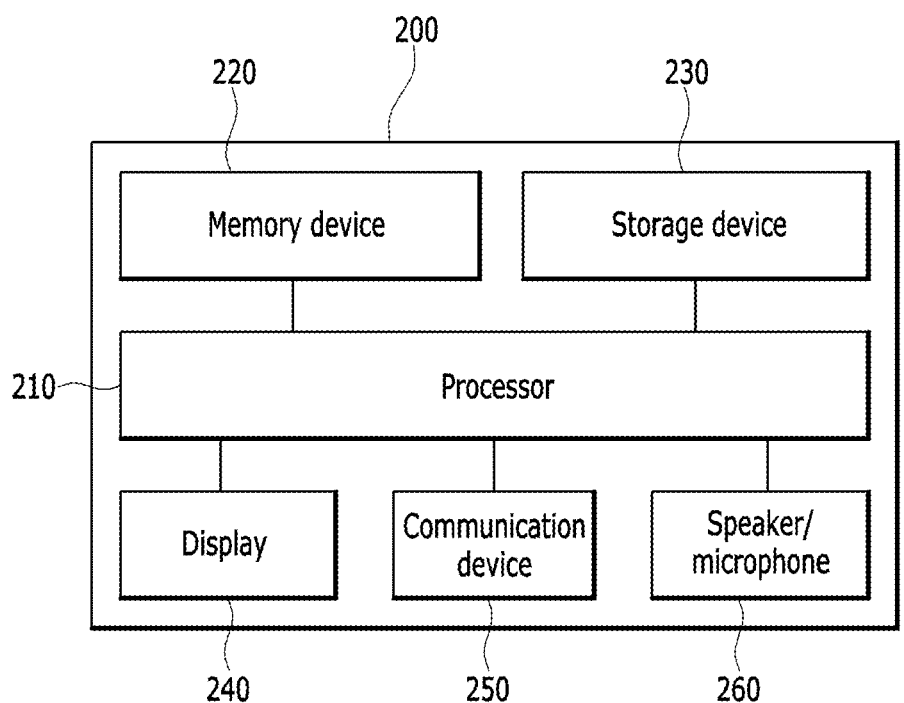
FIG. 14 shows a block diagram of a user terminal according to an exemplary embodiment of the present invention.

FIG. 13 shows a configuration diagram of a device for analyzing a situation of a called terminal according to an exemplary embodiment of the present invention, and FIG. 14 shows a block diagram of a user terminal according to an exemplary embodiment of the present invention.

Referring to FIG. 13, the analyzing device 100 includes a sound source information storage unit 110, a received sound source analysis unit 130, and a called terminal situation output unit 150 in order to realize the method for the called terminal to analyze a situation described with reference to FIG. 1 to FIG. 12. The analyzing device 100 may further include a monitoring unit 170. The analyzing device 100 may further include a call connection processing unit 190.

The sound source information storage unit 110 stores feature informations of the situation guidance sound sources. The sound source information storage unit 110 may include the sound source information storage unit 112 from a beep/tone and the sound source information storage unit 114 from a starting point.

The received sound source analysis unit 130 compares feature informations of respective situation guidance sound sources stored in the sound source information storage unit 110 and the received sound source to extract a situation guidance sound source corresponding to the received sound source. The received sound source analysis unit 130 may extract the analysis duration of the position where the core sound source of the first candidate sound source exists from the received sound source with reference to the starting point, and may compare the received sound source and the first candidate sound source relating to the corresponding analysis duration for respective analysis durations to determine whether they correspond to each other by equal to or greater than a reference value. The received sound source analysis unit 130 may detect the beep/tone from the received sound source, and may extract the analysis duration of the position where the core sound source of the second candidate sound source exists from the received sound source with reference to the beep/tone. The received sound source analysis unit 130 may compare the received sound source and the second candidate sound source relating to the corresponding analysis duration for respective analysis durations to extract the candidate sound source that matches by equal to or greater than a reference value.

The called terminal situation output unit 150 outputs the situation of the called terminal based on the analysis result of the received sound source analysis unit 130.

The monitoring unit 170 manages the comparison result value of feature informations of the situation guidance sound sources and the received sound sources, and determines the changed state of the situation guidance sound source based on a distribution of the comparison result value. The monitoring unit 170 may notify of the change of the situation guidance sound source. The feature informations of the changed situation guidance sound source is stored in the sound source information storage unit 110.

The call connection processing unit 190 may transmit a call to at least one called terminal. The call connection processing unit 190 finishes a call attempt when it is difficult to connect the call based on the result of the called terminal situation output unit 150. The call connection processing unit 190 connects the call when the called terminal responds. The call connection processing unit 190 may retransmit a call or a text message to the called terminal according to a predetermined method based on the result of the called terminal situation output unit 150.

The analyzing device 100 may be included in a multi-channel transmitting device. The multi-channel transmitting device represents a device for transmitting a call to a plurality of called terminals, and for example, it may be used by a call center system.

The analyzing device 100 for multi-channel transmission transmits a call to a plurality of called terminals. The analyzing device 100 analyzes the situation guidance voices received from a plurality of called terminals, and when it is difficult to connect the call, it does not connect the call to the call center staff and stops the call connection. The analyzing device 100 transmits the connected call to the call center staff when the call is connected (when the called party responds). Through this, the time for the call center staff to wait for the call connection may be reduced.

When a situation guidance voice received from a certain called terminal is analyzed to find that it is busy or it is turned off, the analyzing device 100 may retransmit a call to the corresponding called terminal after a predetermined time. When a situation guidance voice received from a certain called terminal is analyzed to find that it is an unknown number, the analyzing device 100 may store that the corresponding called terminal is unknown and may report the same.

Referring to FIG. 14, the user may use various contents through a user terminal, such as searching for information, listening to music, or navigation. However, to make a call, the user stops a job such as listening to music, and performs a process relating to the call. Therefore, the user may know if he can call the called party after he stands by, hearing a ring back tone, until the called party receives the call, or he hears the guidance sound source provided by the telecommunication service provider. Further, when the user fails to call since the called party is busy, the telephone is tuned off, there is no answer, etc., he has to reattempt to call after a predetermined time or he has to transmit an SMS, which is an inconvenient job to repeat.

To ease the inconvenience, the method for analyzing a situation of a called terminal may be included in the user terminal as software or additional hardware. The user terminal may be a portable terminal with a built-in communication function such as a smartphone or a smart pad, and a vehicle information processing device such as a navigator.

The user terminal 200 is configured with hardware including a processor 210, a memory device 220, a storage device 230, a display 240, a communication device 250, and a speaker/microphone 260, and a program executable in combination with hardware is stored in a predetermined position. The hardware has a configuration and performance for performing the method according to the present invention. A program (application) of the method for analyzing a situation of a called terminal according to the present invention described with reference to FIG. 1 to FIG. 14 is written in a program language, is combined with the hardware of the user terminal 200, and is performed. The processor 210 is combined to the hardware such as the memory device 220 to drive the program, and performs the method for analyzing a situation of a called terminal.

The program is implemented so that the processor 210 may be operable as follows.

The program is realized to transmit a call and analyze the situation guidance sound source based on the method for analyzing a situation of a called terminal of the present invention. In this instance, the program is realized to perform an application (e.g., reproduction of music or use of navigator, etc.) through the display 240 or the speaker/microphone 260 in advance to calling until the called terminal and the call are connected. Through this, the user may not listen to the unneeded guidance sound source or ring back tone of the telecommunication service provider. When the user inputs whether to display a call transmission start to a screen or notify of the same through an audio means for setting information, the user terminal 200 notifies the user of the call transmission start according to the established method.

When the called terminal has responded, the program is realized to notify that the call is connected to the user through the display 240 or the speaker 260. The program is realized, when the call is connected, to stop the task such as the reproduction of music or use of a navigator and be switched to a calling mode. That is, the user terminal 200 is realized, when the call is connected, to stop the application for reproducing music, and output data received from the called terminal to at least one of the speaker and the display.

When the called terminal does not answer for a predetermined time (e.g., 30 seconds), the program is realized to notify the user of the situation that there is no answer through the display 240 or the speaker 260.

The program is realized to analyze the situation guidance sound source of the called terminal provided by the telecommunication service provider, and when the called terminal is busy/turned off/call-rejected/not answered/unknown/overseas roaming, to stop the call attempt. The program is realized to notify of situation information of the called terminal by displaying the same through characters or sound by use of the display 240 or the speaker 260 according to the user's setting.

The program may be realized to retransmit a call to the called terminal or transmit a message thereto based on time information established to respective situations of the called terminal such as busy/turn off/call rejection/no answer/unknown number/overseas roaming and various processing methods. For example, when the situation of the called terminal is analyzed to be busy or no answer, the program may be realized to retransmit the call at a predetermined time (e.g. in 10 minutes). When the situation of the called terminal is the turn-off situation, the program may be realized to transmit an SMS (text message) and retransmit a call in an hour. When the situation of the called terminal is the call rejection situation, the program may be realized to transmit an SMS instead of retransmission.

As described, when the user uses the user terminal to which the method for analyzing a situation of a called terminal according to the present invention is applied, the time for standing by for a call connection to the called terminal may be reduced, and the time unnecessarily spent because of a call disconnection may be reduced. Further, the user terminal performs a multi-purpose function as well as the calling function. Therefore, the user need not finish the content or application in execution until the call is connected when he attempts to connect a call while performing content or an application by use of a user terminal. Particularly, the user terminal may analyze the situation of the called terminal, reattempt a call according to the situation of the called terminal, or transmit an SMS, thereby increasing the user's convenience.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for analyzing, by an apparatus, a situation of a called terminal based on a sound source provided by a telecommunication service provider, comprising:
   storing feature information of situation guidance sound sources provided by telecommunication service providers according to the situation of the called terminal;
   after a call connection request to a called terminal, receiving a sound source provided by a telecommunication service provider according to a situation of the called terminal;
   extracting at least one analysis duration of the received sound source with reference to a beep/tone of the received sound source, corresponding to feature information of at least one candidate sound source among the situation guidance sound sources; and
   determining a situation of the called terminal based on a matching degree of the received sound source and the candidate sound source relating to a corresponding analysis duration, for respective analysis durations.

2. The method of claim 1, wherein the feature information include
   position information where a core sound source of a corresponding situation guidance sound source exists, length information of the core sound source, and a voice pattern of the core sound source with reference to a beep/tone of respective situation guidance sound sources.

3. The method of claim 2, wherein
   the analysis duration of the received sound source is a position corresponding to a core sound source of the respective candidate sound sources, with reference to a beep/tone of the received sound source.

4. The method of claim 2, wherein
   the determining of a situation of the called terminal includes:
   comparing voice patterns of respective analysis durations of the received sound source and at least one candidate sound source relating to the corresponding analysis duration;
   calculating matching degrees of the received sound source and the at least one candidate sound source based on a comparison result; and
   determining the situation of the called terminal based on each matching degree of the at least one candidate sound source.

5. The method of claim 1, wherein
   the extracting of at least one analysis duration includes:
   extracting a position corresponding to feature information of the situation guidance sound sources from the received sound source as a candidate analysis duration, based on feature information of the situation guidance sound sources;
   when a first candidate analysis duration relating to a first situation guidance sound source is a silent syllable duration, excluding the first situation guidance sound source from the candidate sound source; and when a second candidate analysis duration relating to a second situation guidance sound source is provided before a starting point of the received sound source, excluding the second situation guidance sound source from the candidate sound source.

6. The method of claim 1, wherein
the situation guidance sound sources include sound sources for notifying at least one situation of busy, turn-off, call rejection, overseas roaming, and an unknown number.

7. A method for analyzing, by an apparatus, a situation of a called terminal based on a sound source provided by a telecommunication service provider, comprising:
storing first feature information of at least one first situation guidance sound sources, wherein the first feature information are extracted with reference to a starting point of the at least one first situation guidance sound source;
storing second feature information of at least one second situation guidance sound source, wherein the second feature information are extracted with reference to a beep/tone of the at least one second situation guidance sound source;
receiving a received sound source provided by a telecommunication service provider according to a situation of a called terminal;
determining whether the received sound source corresponds to one of the first situation guidance sound sources, by comparing the received sound source and the first feature information of the first situation guidance sound sources with reference to a starting point of the received sound source; and
when the received sound source does not correspond to one of the first situation guidance sound sources, determining whether the received sound source corresponds to one of the second situation guidance sound sources, by comparing the received sound source and the second feature information of the second situation guidance sound sources with reference to a beep/tone of the received sound source.

8. The method of claim 7, wherein
the second situation guidance sound source includes a beep/tone, and
the first situation guidance sound source does not include a beep/tone among the situation guidance sound sources of the called terminal provided by at least one telecommunication service provider.

9. The method of claim 7, wherein
the first feature information of the first situation guidance sound source include position information where a core sound source of the first situation guidance sound source exists, length information of the core sound source, and a voice pattern of the core sound source with reference to a starting point of the first situation guidance sound source.

10. The method of claim 9, wherein
the determining whether the received sound source corresponds to one of the first situation guidance sound sources includes:
extracting an analysis duration corresponding to the first feature information of the first situation guidance sound sources from the received sound source with reference to a starting point of the received sound source; and
determining a situation of the called terminal based on a matching degree of the received sound source and a first situation guidance sound source relating to the corresponding analysis duration for respective analysis durations.

11. The method of claim 7, wherein
the second feature information of the second situation guidance sound source include position information where a core sound source of the second situation guidance sound source exists, length information of the core sound source, and a voice pattern of the core sound source with reference to a beep/tone of the second situation guidance sound source.

12. The method of claim 11, wherein
the determining whether the received sound source corresponds to one of the second situation guidance sound sources includes:
extracting an analysis duration corresponding to the second feature information of the respective second situation guidance sound sources from the received sound source with reference to a beep/tone of the received sound source; and
determining a situation of the called terminal based on a matching degree of the received sound source and a second situation guidance sound source relating to the corresponding analysis duration for respective analysis durations.

13. The method of claim 7, wherein
the determining whether the received sound source corresponds to one of first situation guidance sound sources includes:
calculating a matching score of the received sound source and the first feature information of the respective first situation guidance sound sources; and
when the matching score of a specific situation guidance sound source among the first situation guidance sound sources is equal to or greater than a reference value, determining the received sound source to be the specific situation guidance sound source.

14. The method of claim 7, wherein
the determining whether the received sound source corresponds to one of the second situation guidance sound sources includes:
calculating a matching score of the received sound source and the second feature information of the respective second situation guidance sound sources; and
when the matching score of a specific situation guidance sound source among the second situation guidance sound sources is equal to or greater than a reference value, determining the received sound source to be the specific situation guidance sound source.

15. A computer-readable recording medium stored a program executed by hardware including a processor, a memory device, a speaker, and a display of a user terminal, the program being executed to perform processes comprising:
requesting a call connection to a called terminal;
extracting a beep/tone from a received sound source provided by a telecommunication service provider according to a situation of the called terminal;
extracting at least one analysis duration of the received sound source with reference to a beep/tone of the received sound source, corresponding to feature information of at least one candidate sound source among a plurality of situation guidance sound sources; and
determining a situation of the called terminal based on a matching degree of the received sound source and a candidate sound source relating to the corresponding analysis duration for respective analysis durations, wherein the feature information include position information where a core sound source of the corresponding situation guidance sound source exists, length information of the core sound source, and a voice pattern of the core sound source with reference to a beep/tone of respective situation guidance sound sources.

16. The computer-readable recording medium of claim 15, wherein the processes performed by the program further comprise:
when the received sound source is determined to be one of a busy-state guidance sound source, a turn-off guidance sound source, a call rejection guidance sound source, an unknown number guidance sound source, and an overseas roaming guidance sound source according to a result of determining the situation of the called terminal, notifying that the called terminal is in a situation that corresponds to the determined guidance sound source through at least one of the speaker and the display.

17. The computer-readable recording medium of claim 16, wherein the processes performed by the program further comprise:
when the called terminal is in one of a busy situation, a turn-off situation, a call rejection situation, an unknown number situation, and an overseas roaming situation, calling back to the called terminal or transmitting a text message to the called terminal according to a rule established for the corresponding situation; and
when the called terminal does not answer, calling back to the called terminal or transmitting a text message to the called terminal according to a rule established for the no-answer situation,
wherein a context of the text message is different according to a transmitting situation.

18. The computer-readable recording medium of claim 15, wherein
the requesting of a call connection to the called terminal includes:
when attempting the call connection while a specific application is running in the user terminal, outputting content of the specific application to at least one of the speaker and the display while the call connection is attempted; and
when the call is connected, stopping the running of the specific application, and outputting data received from the called terminal to at least one of the speaker and the display.

19. The computer-readable recording medium of claim 15, wherein
the extracting of a beep/tone from the received sound source includes:
determining whether the received sound source includes an additional situation guidance sound source that is different from the plurality of situation guidance sound sources with reference to a starting point of the received sound source, until a beep/tone is detected from the received sound source;
when the beep/tone is detected in the received sound source while determining whether the received sound source includes the additional situation guidance sound source, stopping the determining of whether the received sound source includes the additional situation guidance sound source, and going to the extracting of at least one analysis duration corresponding to feature information of at least one candidate sound source; and
when the received sound source is determined to include the additional situation guidance sound source before the beep/tone is detected from the received sound source, stopping detecting of a beep/tone, and outputting a situation of the called terminal corresponding to the additional guidance sound source included in the received sound source, and
the program further includes, when the received sound source does not correspond to one of the plurality of situation guidance sound sources and the additional situation guidance sound source, determining the called terminal to be in a no-answer situation.

* * * * *